(12) United States Patent
Kim et al.

(10) Patent No.: US 9,325,482 B2
(45) Date of Patent: Apr. 26, 2016

(54) METHOD FOR COORDINATED SCHEDULING IN WIRELESS COMMUNICATION SYSTEM AND APPARATUS THEREFOR

(71) Applicant: LG Electronics Inc., Seoul (KR)

(72) Inventors: Kijun Kim, Seoul (KR); Jonghyun Park, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 14/330,127

(22) Filed: Jul. 14, 2014

(65) Prior Publication Data

US 2015/0071191 A1    Mar. 12, 2015

Related U.S. Application Data

(60) Provisional application No. 61/875,691, filed on Sep. 10, 2013.

(51) Int. Cl.
*H04W 4/00* (2009.01)
*H04L 5/00* (2006.01)

(52) U.S. Cl.
CPC ............ *H04L 5/0073* (2013.01); *H04L 5/0035* (2013.01); *H04L 5/0057* (2013.01); *H04L 5/001* (2013.01); *H04L 5/0023* (2013.01); *H04L 5/0048* (2013.01)

(58) Field of Classification Search
None
See application file for complete search history.

(56) References Cited

U.S. PATENT DOCUMENTS

| | | | | |
|---|---|---|---|---|
| 2014/0036796 A1* | 2/2014 | Etemad | ................ | H04W 24/04 370/329 |
| 2014/0192734 A1* | 7/2014 | Ng | ........................ | H04L 5/0035 370/329 |
| 2014/0293914 A1* | 10/2014 | Maattanen | ........ | H04W 72/1278 370/329 |

* cited by examiner

*Primary Examiner* — Frank Duong
(74) *Attorney, Agent, or Firm* — Morgan, Lewis & Bockius LLP

(57) ABSTRACT

In an aspect of the present application, provided herein is a method for transmitting signals for coordinated scheduling in a wireless communication system, the method performed by a base station and comprising: transmitting, to a neighbor base station, information on a transmission scheme in a specific channel state information-interference measurement (CSI-IM) resource; and receiving, from a mobile terminal served by the base station, a measurement result with respect to a downlink signal transmitted from the neighbor base station according to the transmission scheme in the specific CSI-IM resource, wherein the transmission scheme is determined according to whether there is downlink data to be transmitted by the base station in a subframe to which the specific CSI-IM resource belongs and/or whether the mobile terminal configured with the specific CSI-IM resource is allocated a single CSI process or multiple CSI processes.

11 Claims, 9 Drawing Sheets

METHOD FOR COORDINATED SCHEDULING IN WIRELESS COMMUNICATION SYSTEM AND APPARATUS THEREFOR

This application claims the benefit of U.S. provisional application No. 61/875,691, filed on Sep. 10, 2013, which is hereby incorporated by reference as if fully set forth herein.

BACKGROUND OF THE INVENTION

1. Field of the Invention

The present invention relates to a method for interference cancellation in a wireless communication system and an apparatus therefor.

2. Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

The present invention is directed to a method for supporting efficient coordinated scheduling in a wireless communication system that substantially obviates one or more problems due to limitations and disadvantages of the related art.

In an aspect of the present invention, provided herein is a method for transmitting signals for coordinated scheduling in a wireless communication system, the method performed by a base station and comprising: transmitting, to a neighbor base station, information on a transmission scheme in a specific channel state information-interference measurement (CSI-IM) resource; and receiving, from a mobile terminal served by the base station, a measurement result with respect to a downlink signal transmitted from the neighbor base station according to the transmission scheme in the specific CSI-IM resource, wherein the transmission scheme is determined according to whether there is downlink data to be transmitted by the base station in a subframe to which the specific CSI-IM resource belongs and/or whether the mobile terminal configured with the specific CSI-IM resource is allocated a single CSI process or multiple CSI processes.

Alternatively or additionally, if there is downlink data to be transmitted by the base station in the subframe to which the specific CSI-IM resource belongs, the transmission scheme may indicate that the base station transmits the downlink data or a dummy signal using the same precoding matrix index (PMI) as that of the downlink data in the specific CSI-IM resource, and if there is no downlink data to be transmitted by the base station in the subframe to which the specific CSI-IM resource belongs, the transmission scheme may indicatee that the base station transmits no signal in the specific CSI-IM resource.

Alternatively or additionally, if there is downlink data to be transmitted by the base station in the subframe to which the specific CSI-IM resource belongs, the transmission scheme may indicate that the base station transmits a dummy signal using a full-rank PMI in the specific CSI-IM resource, and if there is no downlink data to be transmitted by the base station in the subframe to which the specific CSI-IM resource belongs, the transmission scheme may indicate that the base station transmits no signal in the specific CSI-IM resource.

Alternatively or additionally, if there is downlink data to be transmitted after specific time, the transmission scheme may indicate that the base station transmits a dummy signal using the same PMI as that of the downlink data to be transmitted after the specific time in the specific CSI-IM resource, and if there is no downlink data to be transmitted after the specific time, the transmission scheme may indicatee that the base station transmits no signal in the specific CSI-IM resource.

Alternatively or additionally, if there is downlink data to be transmitted by the base station in the subframe to which the specific CSI-IM resource belongs, the transmission scheme may indicate the base station transmits the downlink data or a dummy signal using the same PMI as that of the downlink data in the specific CSI-IM resource, and if there is no downlink data to be transmitted by the base station in the subframe to which the specific CSI-IM resource belongs, the transmission scheme may indicate that the base station transmits a dummy signal using a full-rank PMI in the specific CSI-IM resource.

Alternatively or additionally, the transmission scheme may indicate that the base station transmits a dummy signal using a full-rank PMI in the specific CSI-IM resource.

Alternatively or additionally, the transmission scheme may indicate the base station transmits no signal in the specific CSI-IM resource.

Alternatively or additionally, the method may further comprise determining whether the neighbor base station transmits downlink signal during a specific interval based on the measurement result.

Alternatively or additionally, the method may further comprise transmitting, to the neighbor base station, a message for requesting the neighbor base station to stop transmission of downlink signal during the specific interval upon determining that the neighbor base station does not transmit the downlink signal during the specific interval, wherein the message includes a metric value of a gain according to stop of transmission of the neighbor base station or necessity for stop of transmission.

In another aspect of the present invention, provided herein is a method for transmitting signals by a base station for coordinated scheduling in a wireless communication system, the method performed by the base station and comprising: receiving, from a neighbor base station, information on a transmission scheme in a specific CSI-IM resource; and transmitting downlink signal in the specific CSI-IM resource according to the transmission scheme, wherein the transmission scheme is determined according to whether there is downlink data to be transmitted by the base station in a subframe to which the specific CSI-IM resource belongs and/or whether the mobile terminal configured with the specific CSI-IM resource is allocated a single CSI process or multiple CSI processes.

In another aspect of the present invention, provided herein is a base station for coordinated scheduling in a wireless communication system, comprising: a radio frequency (RF) unit; and a processor configured to control the RF unit, wherein the processor is configured to transmit, to a neighbor base station, information on a transmission scheme in a specific CSI-IM resource and to receive, from a UE served by the base station, a measurement result with respect to a downlink signal transmitted from the neighbor base station according to the transmission scheme in the specific CSI-IM resource, wherein the transmission scheme is determined according to whether there is downlink data to be transmitted by the base station in a subframe to which the specific CSI-IM resource belongs and/or whether the mobile terminal configured with the specific CSI-IM resource is allocated a single CSI process or multiple CSI processes.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
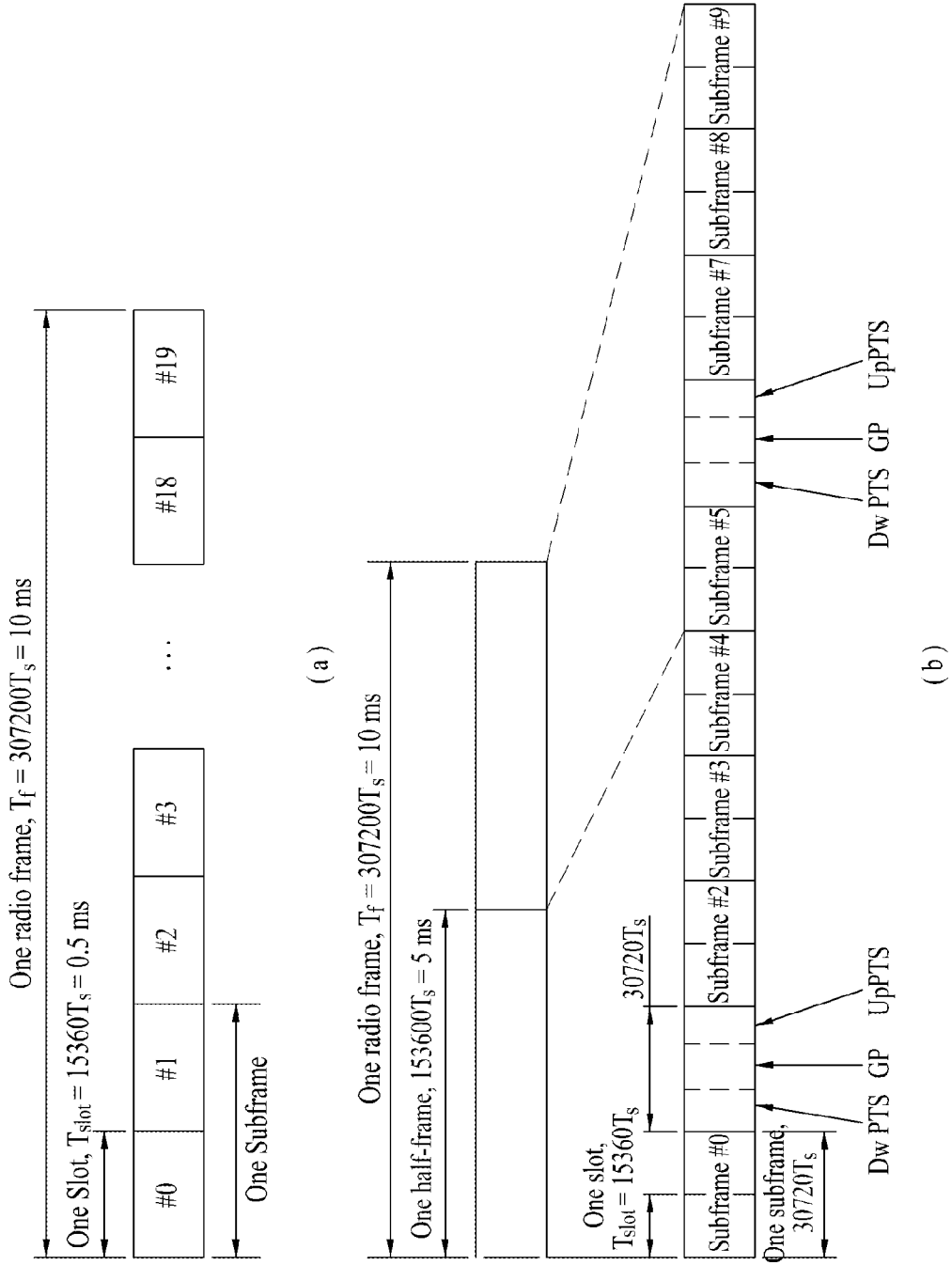
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
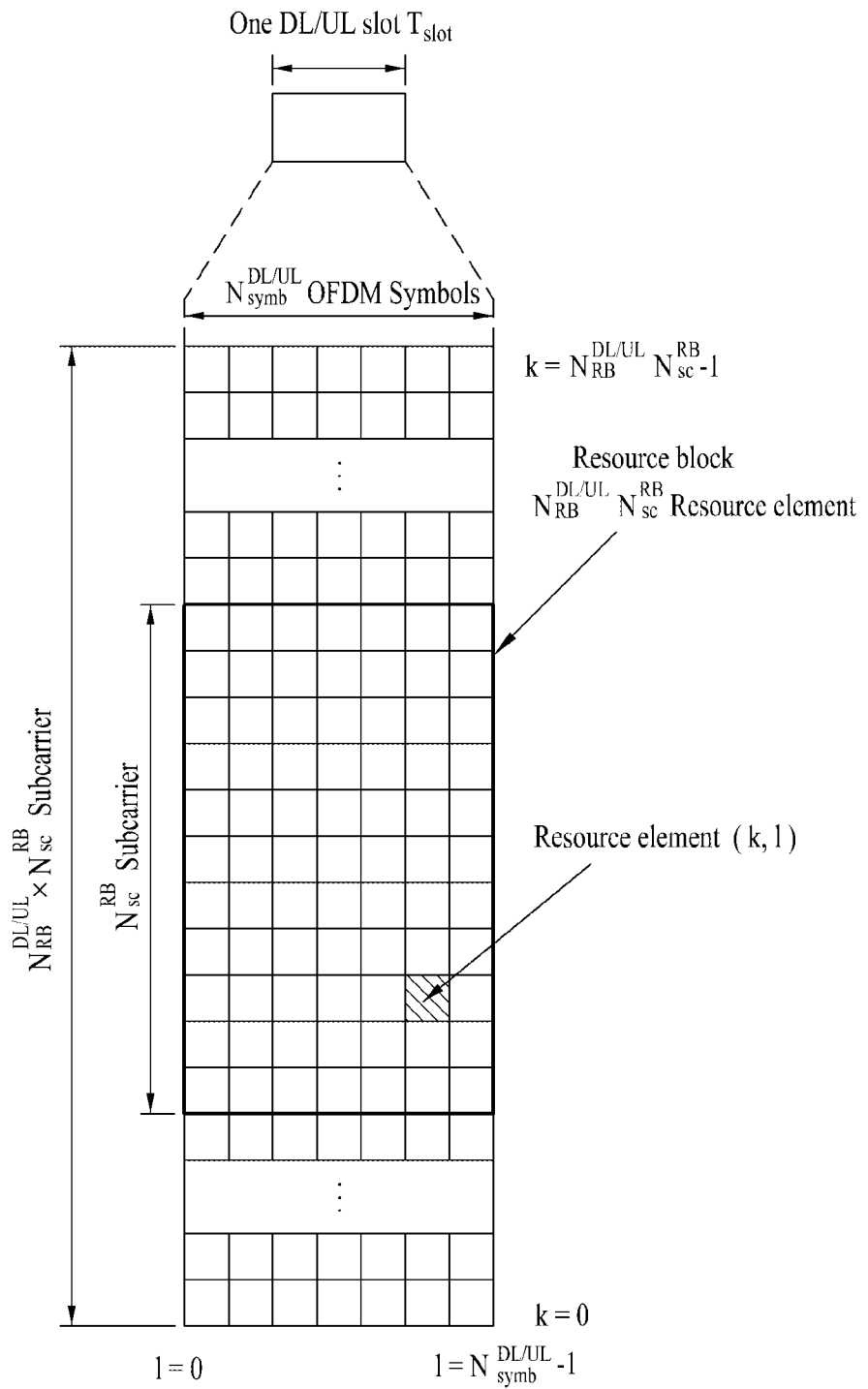
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

$N_{symb}^{DL/UL} * N_{sc}^{RB}-1$ in the frequency domain and 1 is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
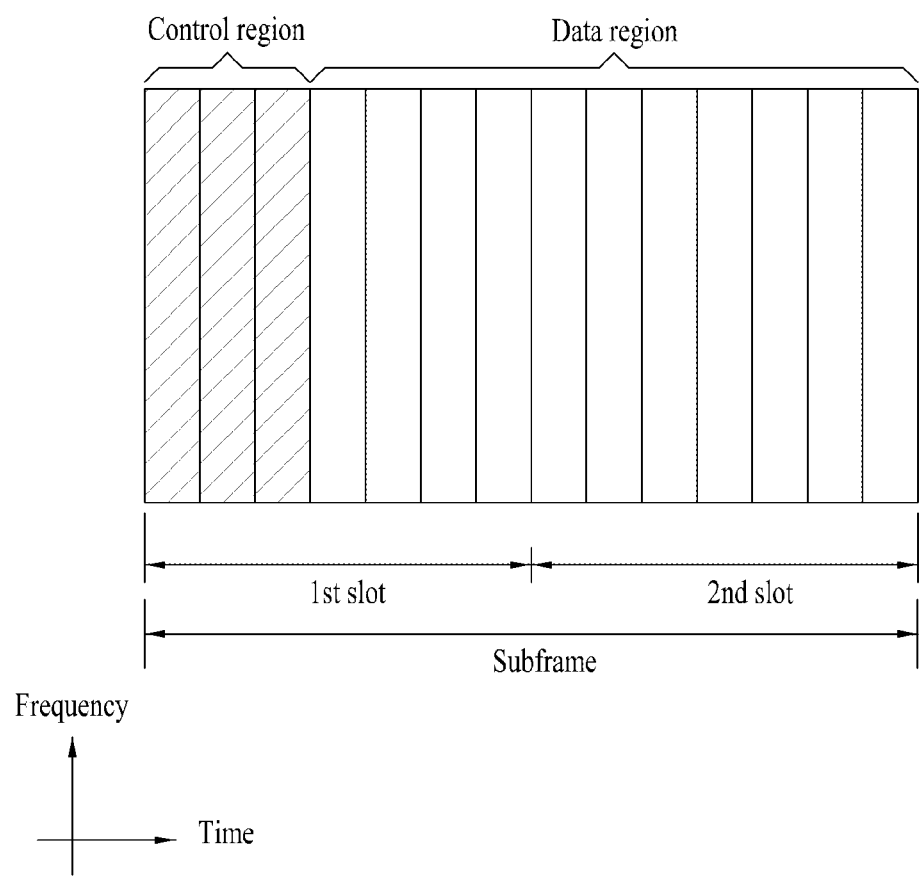
FIG. 3 is a diagram showing a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
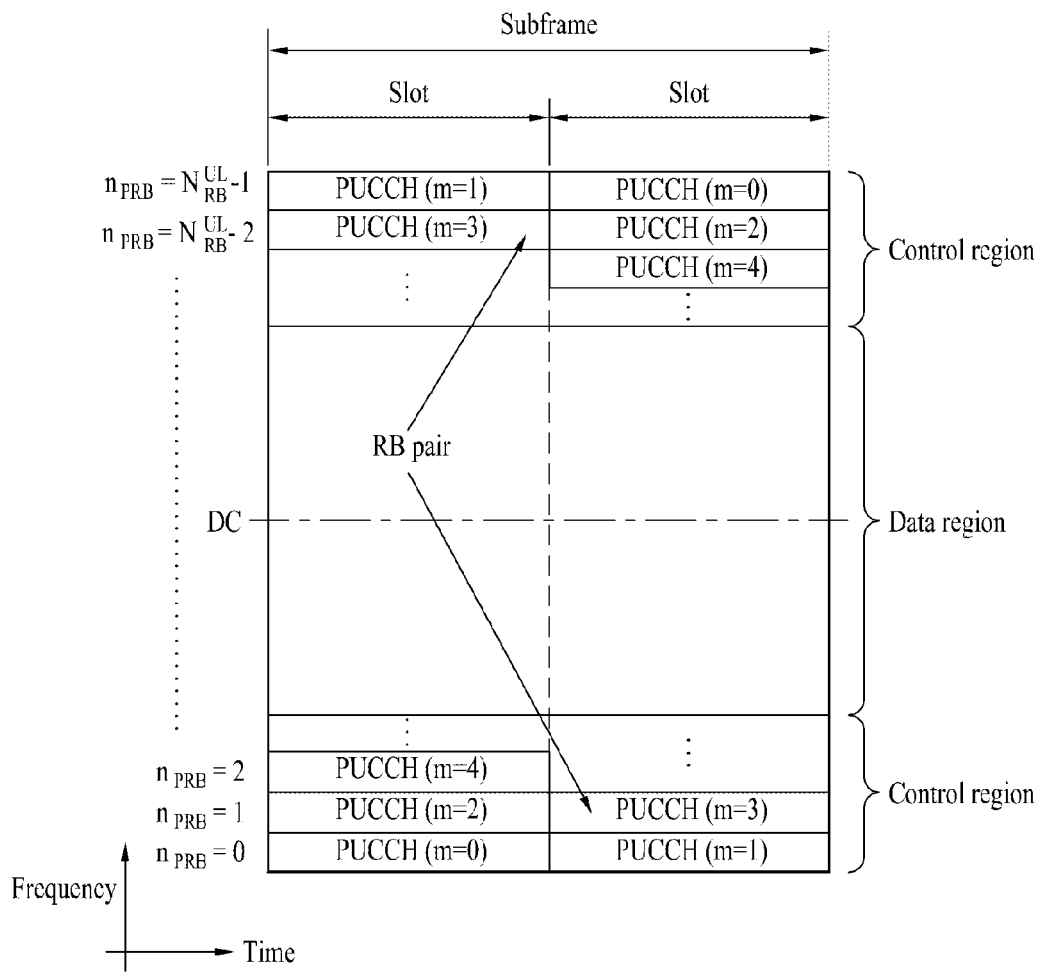
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMFRI + ACK/NACK | Normal CP only |
| 2b | QPSK + QPSK | 22 | CQI/PMFRI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Coordinated Multi-Point (CoMP) Transmission and Reception

According to improved system performance requirements of a 3GPP LTE-A system, CoMP transmission/reception technlogy (co-MIMO, collaborative MIMO or network MIMO) is proposed. CoMP technology may increase performance of a UE located at a cell edge and increase average sector throughput.

In general, in a multi-cell environment in which a frequency reuse factor is 1, performance and average sector throughput of a UE located at a cell edge may be reduced due to inter-cell interference (ICI). In order to reduce ICI, in a legacy LTE system, a method of enabling a UE located at a cell edge to have appropriate throughput and performance in an environment restricted by interference using a simple passive method such as fractional frequency reuse (FFR) via specific power control was applied. However, ICI is reduced or reused by a UE as a desired signal more preferably than reduction of frequency resources used per cell. In order to accomplish the above-described object, a CoMP transmission scheme is applicable.

The CoMP scheme applicable to downlink may be largely divided into a joint processing (JP) scheme and a coordinated scheduling/beamforming (CS/CB) scheme.

In the JP scheme, each point (BS) of a CoMP unit may use data. The CoMP unit refers to a set of BSs used in the CoMP scheme. The JP scheme may be classified into a joint transmission scheme and a dynamic cell selection scheme.

The joint transmission scheme refers to a scheme for simultaneously transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively cancel interference with another UE.

The dynamic cell selection scheme refers to a scheme for transmitting a PDSCH from one point (of the CoMP unit). That is, data transmitted to a single UE at a specific time is transmitted from one point and the other points in the coordinated unit do not transmit data to the UE at that time. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination among a plurality of geographically separated points. CoMP schemes applicable to uplink may be classified into Joint Reception (JR) and Coordinated Scheduling/Beamforming (CS/CB).

JR indicates that a plurality of reception points receives a signal transmitted through a PUSCH, the CS/CB scheme indicates that only one point receives a PUSCH, and user scheduling/beamforming is determined by the coordination of the cells of the CoMP unit.

A plurality of UL points (that is, receiving points (RPs)) is referred to as UL CoMP and a plurality of DL points (that is, transmitting points (TPs)) is referred to as DL CoMP.

In 3GPP LTE Rel-11, a UE acting as a target of the CoMP scheme can estimate a channel of TPs capable of provisionally participating in the CoMP using CSI-RS (channel state information reference signal) resources defined as a CoMP measurement set, and feeds back CSI (such as PMI (precoding matrix indicator), CQI (channel quality indicator), RI (rank indicator), etc.) to its own serving cell on the basis of the estimated channel value. In the network, the UE may establish a Dynamic Point Selection (DPS) scheme in which s a TP having a relatively-superior channel quality is selected on the basis of the feedback CSI and data is transmitted to the UE, the CS/CB (coordinated scheduling/coordinated beamforming) scheme in which TPs participating in the CoMP control scheduling and beamforming so as to reduce inter-interference, and a Joint Transmission (JT) scheme in which TPs participating in the CoMP transmit the same data to the UE.

CSI Process

For CSI reporting of a UE, a CSI process defined by a CSI-RS resource for received signal measurement and a CSI-IM (interference measurement) resource for interference measurement may be designated. The UE measures spatial characteristics and intensity of a received signal from the CSI-RS resource and measures spatial characteristics and interference of an interference signal from the CSI-IM resource to determine an RI, a PMI and a CQI of the CSI process and reports the determined RI, PMI and CQI to an eNB. The UE may be assigned a plurality of CSI processes in order to support CoMP operation between eNBs. A plurality of pieces of CSI derived from different CSI processes have independent periods and subframe offsets and are fed back from the UE to a network. That is, each CSI process has a configuration for independent CSI reporting.

CSI-IM

Figure 5:
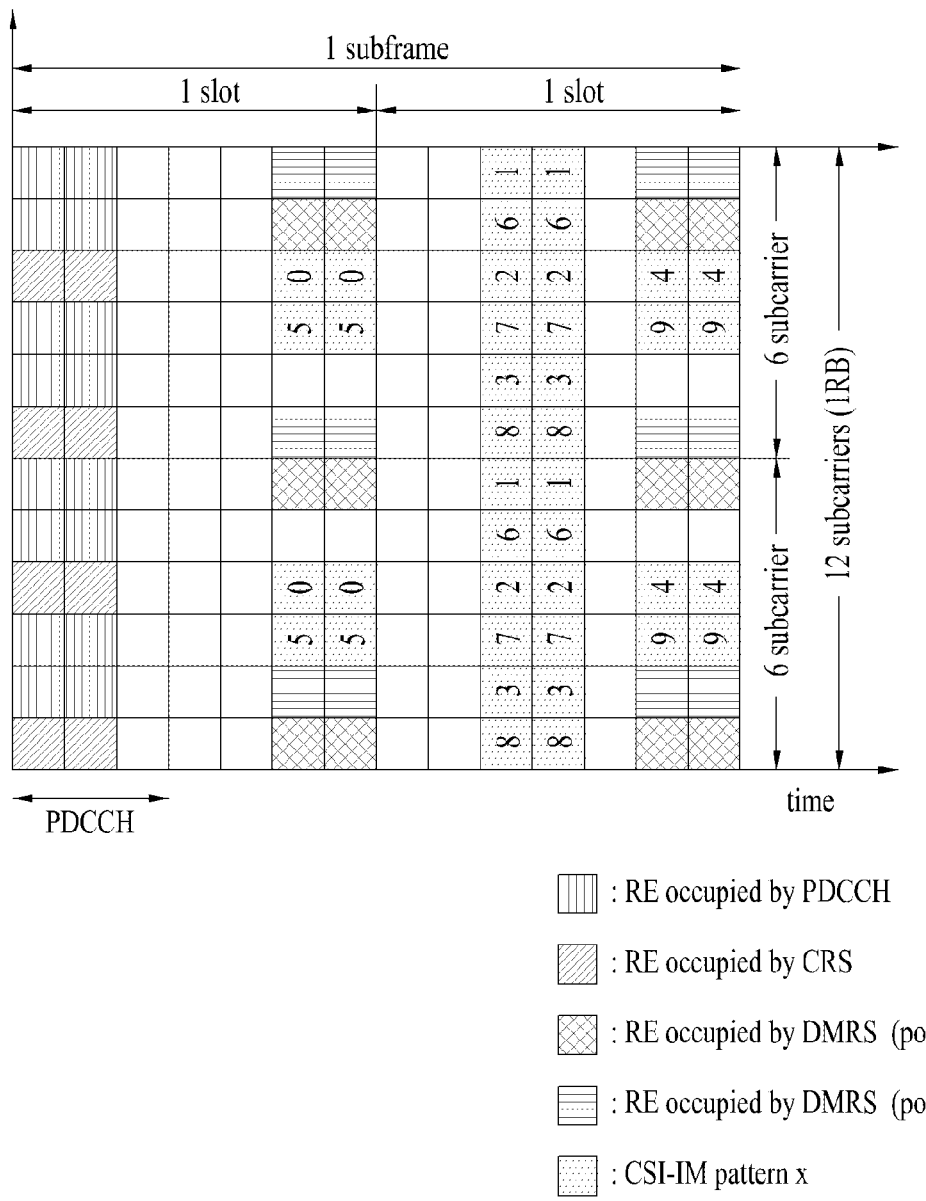
FIG. 5 shows resource mapping of channel state information-interference measurement (CSI-IM) on a subframe used in a 3GPP LTE/LTE-A system.

A CSI-IM resource occupies 4 REs per RB in a configured subframe and corresponds to one of 10 possible positions, as shown in FIG. 5. In FIG. 5, 4 REs given the same number are assigned to one CSI-IM resource. A CSI-IM resource can be set for every 5, 10, 20, 40 or 80 subframes.

CSI Feedback Delay and CSI-RS Resource

Flash Effect of Interference

Figure 6:
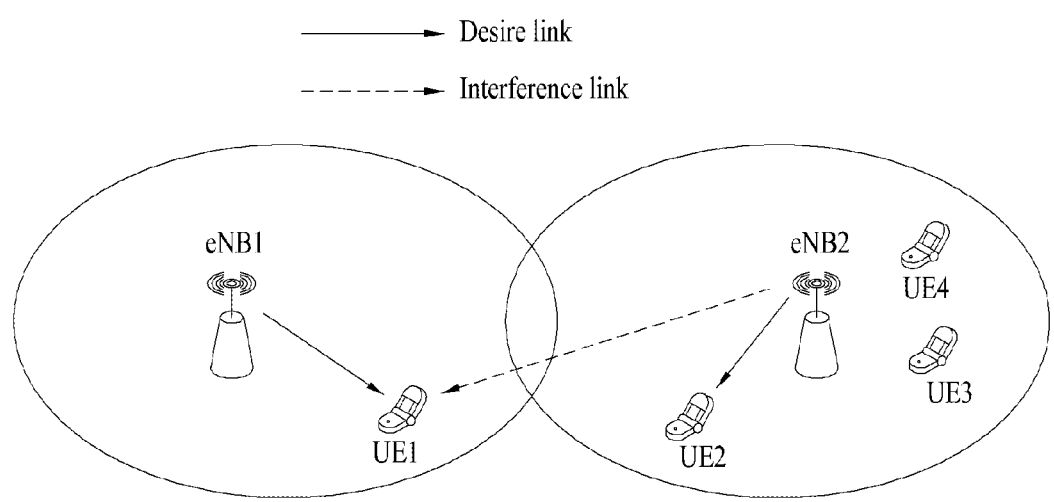
FIG. 6 illustrates a wireless communication system according to one embodiment of the present invention.

FIG. 6 illustrates an example in which UE1 is interfered by a signal transmitted from eNB2 corresponding to a neighbor eNB while UE1 receives a PDSCH from eNB1 corresponding to a serving eNB of UE1. A spatial characteristic, typically, transmission PMI of eNB2 is varied according to which UE receives a PDSCH in a corresponding subframe/subband. Accordingly, spatial characteristics of interference applied to UE1 are affected by a PM (precoding matrix) used for a PDSCH transmitted from eNB2.

Since spatial characteristics of an interference signal are varied according to a PM applied to the interference signal, characteristics of interference applied to UE1 are severely changed when a neighbor cell transmits a PDSCH while changing scheduled UEs per subframe or subband. If the neighbor cell fixes scheduled UEs in predetermined subframes and in a predetermined subband region, then characteristics of interference applied to UE1 in the subband region are maintained for a predetermined time.

Figure 7:
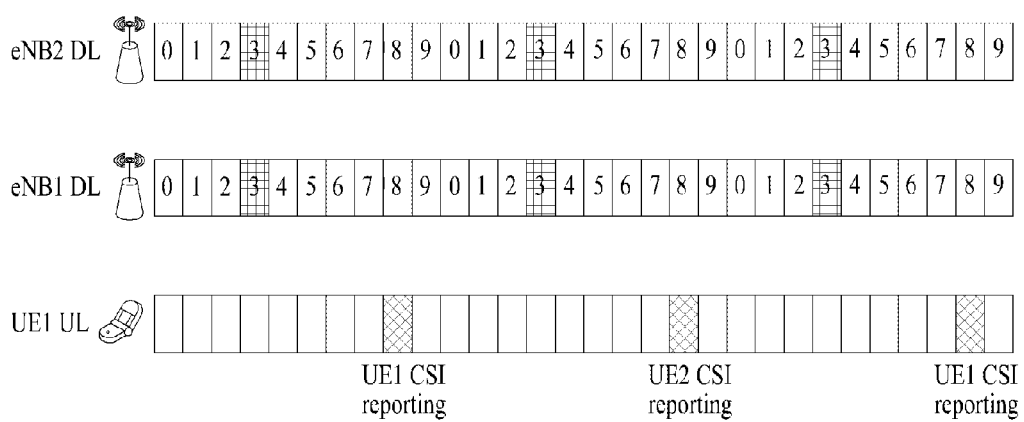
FIG. 7 shows delay of channel state information reporting.

FIG. 7 illustrates exemplary CSI reporting according to transmission of two eNBs. UE1 performs CSI reporting at time n. Here, feedback CSI is determined on the assumption that a PDSCH is received in a valid CSI-RS resource at time n−k or prior to time n−k. Here, k is determined as 4 or 5 based on the number of set CSI processes. FIG. 7 illustrates a case in which an eNB sets CSI-RS and CSI-IM in subframes corresponding to subframes indexes #3, #13 and #26. A UE determines CSI to be reported in the subframe corresponding to subframe index #8 on the basis of a measurement result in a CSI-RS resource and a CSI-IM resource at subframe index #3 or prior thereto. The eNB can start PDSCH scheduling at subframe index #n+d on the basis of CSI reported by UE1 at subframe index #n. Here, d is varied with time required for the eNB to process CSI reported by UE1. Consequently, a PDSCH can be transmitted after subframe index #(n+d) on the basis of CSI measured at subframe index #(n−k). Accordingly, (k+d) is called CSI feedback delay. If channel variation is small in (k+n) subframes corresponding to CSI feedback delay, then spatial characteristics of a received signal are maintained and thus performance deterioration due to feedback delay is modest. However, spatial characteristics of an interference signal vary when PM applied to the interference signal is changed even if there is no channel variation. While a PDSCH is transmitted after subframe index #(n+d) on the basis of PM of an interference signal, applied to a CSI-IM resource set at subframe index #(n−k) or prior thereto for CSI measurement, and the corresponding CSI, interference and spatial characteristics of interference are varied since the PM of the interference signal, applied to a PDSCH transmission region, is changed at the corresponding transmission time to cause CQI inaccuracy, resulting in decrease in efficiency of MCS determination of the transmitted PDSCH. This phenomenon becomes serious when a reception scheme for improving reception performance using spatial characteristics of an interference signal, such as a reception method using a MMSE-IRC (Minimum Mean Square Error-Interference Rejection Combiner) receiver, is employed.

Multiple CSI Processes and DPB

DPB (dynamic point blank) from among coordinated transmission schemes refers to a method of determining whether a PDSCH is transmitted by neighbor cells for efficient data transmission of a UE located at a cell edge. In DPB, eNBs determine whether a PDSCH is transmitted by cooperatively exchanging information. In the example shown in FIG. 6, blanking of eNB2 is determined by comparing scheduling metric obtained when eNB1 transmits a PDSCH to UE1 and, simultaneously, eNB2 transmits a PDSCH to UE2 with a scheduling metric obtained when eNB1 transmits the PDSCH to UE1 and eNB2 does not transmit the PDSCH. For this comparison, eNB1 allocates two CSI processes to UE1, is reported CSI1 when UE1 is interfered by eNB2 and CSI2 when UE1 is not interfered by eNB2 and respectively calculates data transmission efficiencies of UE1 when eNB2 transmits a signal and when eNB2 does not transmit a signal. Here, eNB2 transmits a signal in an RE position corresponding to a CSI-IM1 resource related to CSI process 1 and does not transmit a signal in an RE position corresponding to a CSI-IM2 resource related to CSI process 2.

When two interfering eNBs are present, 4 CSI processes are allocated as shown in Table 5 and CSI according to whether a neighbor eNB transmits a signal is reported by controlling signal transmission of the neighbor eNB as shown in Table 6.

TABLE 5

| CSI process | CSI-RS configuration | CSI-IM configuration |
|---|---|---|
| CSI process 1 | CSI-RS 1 | CSI-IM 1 |
| CSI process 2 | CSI-RS 1 | CSI-IM 2 |
| CSI process 3 | CSI-RS 1 | CSI-IM 3 |
| CSI process 4 | CSI-RS 1 | CSI-IM 4 |

TABLE 6

| | eNB1 | eNB2 | eNB3 |
|---|---|---|---|
| CSI-IM 1 | non | Tx | Tx |
| CSI-IM 2 | non | Tx | non |
| CSI-IM 3 | non | non | Tx |
| CSI-IM 4 | non | non | non |

For distributed DPB scheduling, eNB1 allocates a plurality of CSI processes to cell-edge UEs, is reported CSI according to whether neighbor cells transmit signals and determines whether blanking of a neighbor cell is helpful based on the reported CSI. Upon determination that blanking of eNB2 corresponding to the neighbor eNB is necessary through such process, eNB1 transmits a blanking request message to eNB2. A gain that can be obtained according to blanking or the need for blanking may be included in the form of a metric value in the blanking request message and transmitted. In addition, desired blanking start timing and blanking interval may be designated in the blanking request message and transmitted.

To respond to such request, eNB2 can notify eNB1 of whether blanking is performed, the blanking start timing and blanking interval. Even when there is no blanking request, eNB2 may notify eNB1 of whether blanking is performed, the blanking start timing and blanking interval when eNB2 may not transmit a PDSCH since there is no longer a UE to be served. The blanking interval may be set to infinity. In this case, it is determined that blanking is valid until a message signaling PDSCH transmission and PDSCH transmission start timing is transmitted.

When eNB2 needs to transmit a PDSCH since a UE to be newly served is present after a period of time during which eNB2 transmits no PDSCH since there is no UE to be served, eNB2 may transmit a message signaling PDSCH transmission start timing to eNB1 prior to transmission of the PDSCH.

A message may be transmitted between eNBs through an interface such as an X2-interface or S1-interface. It is necessary to set blanking start timing and PDSCH transmission start timing in consideration of time required for transmission through the interface.

Method for Transmitting a Signal in a Neighbor Cell CSI-IM Resource

The present invention provides methods for transmitting a signal in an RE position corresponding to a CSI-IM resource of a neighbor cell. The methods are classified based on an operation when there is a PDSCH to be transmitted by a corresponding eNB and an operation when there is no PDSCH to be transmitted by the corresponding eNB, as shown in Table 7.

TABLE 7

| Scheme | When there is a PDSCH to be transmitted | When there is no PDSCH to be transmitted |
|---|---|---|
| 1 | PDSCH or a dummy signal to which the same PMI as that of the PDSCH has been applied | No TX |
| 2 | Dummy signal to which full-rank PMI has been applied | No TX |
| 3 | Dummy signal to which the same PMI as that of a PDSCH that will be transmitted after X msec has been applied, or no Tx if there is no PDSCH that will be transmitted after X msec | Dummy signal to which the same PMI as that of a PDSCH that will be transmitted after X msec has been applied, or no Tx if there is no PDSCH that will be transmitted after X msec |
| 4 | PDSCH or a dummy signal to which the same PMI as that of the PDSCH has been applied | Dummy signal to which full-rank PMI has been applied |
| 5 | Dummy signal to which full-rank PMI has been applied | Dummy signal to which full-rank PMI has been applied |
| 6 | No TX | No TX |

Scheme 1)

When there is a PDSCH to be transmitted, an eNB transmits the PDSCH or a dummy signal to which the same PMI as that of the PDSCH has been applied in a CSI-IM resource position of a neighbor cell. When there is no PDSCH to be transmitted, the eNB transmits no signal in the corresponding position. The scheme in which the eNB transmits the PDSCH in the corresponding position when the PDSCH to be transmitted is present can improve PDSCH transmission efficiency, compared to the scheme of transmitting the dummy signal, because a ZP (zero power) CSI-RS need not be configured in the corresponding position. However, when the corresponding position is preset to the ZP CSI-RS and signaled to served UEs in order to apply the schemes depending on the situation, the dummy signal to which the same PMI as that of the PDSCH has been applied can be transmitted.

Scheme 1 can improve CQI accuracy to obtain high transmission efficiency if a PMI applied to an interference signal when a UE of a neighbor cell receives a PDSCH is equal to a PMI of an interference signal applied to CSI-IM at CSI estimation timing.

Scheme 2)

When there is a PDSCH to be transmitted, the eNB can transmit a dummy signal to which a full-rank PMI has been applied in the CSI-IM resource position of the neighbor cell. When there is no PDSCH to be transmitted, the eNB transmits no signal in the corresponding position. When it is difficult to estimate the PMI applied to an interference signal when a neighbor cell UE receives a PDSCH, inaccuracy of CQI can be minimized by considering the full-rank PMI as the PMI of an interference signal applied to CSI-IM at CSI estimation timing.

The aforementioned scheme 1 is suitable for a case in which a representatively scheduled UE is fixed and a PDSCH is transmitted thereto when the possibility that the PMI is changed during PDSCH scheduling is low, whereas scheme 2 is suitable for a case in which the PDSCH is transmitted while the representatively scheduled UE is changed per subframe when the possibility that the PMI is changed during PDSCH scheduling is high.

Scheme 3)

A dummy signal to which the same PMI as that of a PDSCH to be transmitted after X msec has been applied is transmitted in the CSI-IM resource position of the neighbor cell in both a case in which there is a PDSCH to be transmitted and a case in which there is no PDSCH to be transmitted. To achieve this, the corresponding eNB needs to schedule served UEs before at least X msec.

Schemes 1, 2 and 3 are representative signal transmission schemes to be applied by the neighbor eNB to a CSI-IM resource that needs to be set for a non-CoMP UE, that is, a UE to which only a single CSI process is assigned. The following schemes 4, 5 and 6 are representative signal transmission schemes to be applied by the neighbor eNB to CSI-IM resources that need to be set for a CoMP UE, that is, a UE to which multiple CSI processes are allocated.

Scheme 4)

When there is a PDSCH to be transmitted, the corresponding eNB can transmit the PDSCH or a dummy signal to which the same PMI as that of the PDSCH has been applied in the CSI-IM resource position of the neighbor cell. When there is no PDSCH to be transmitted, the eNB can transmit a dummy signal to which the full-rank PMI has been applied in the corresponding position.

Scheme 5)

The eNB can transmit a dummy signal to which the full-rank PMI has been applied in the CSI-IM resource position of the neighbor cell in both a case in which there is a PDSCH to be transmitted and a case in which there is no PDSCH to be transmitted.

Scheme 6)

No signal is transmitted in the CSI-IM resource position of the neighbor cell in both a case in which there is a PDSCH to be transmitted and a case in which there is no PDSCH to be transmitted.

A CSI-RS resource set for a non-CoMP UE, that is, a UE to which only a single CSI process is allocated and a CSI-RS resource set for a CoMP UE for coordinated transmission such as DPB, that is, a UE to which multiple CSI processes are allocated need to have different characteristics. These characteristics are greatly varied according to which signal transmission scheme is applied to the CSI-IM resource position of the neighbor cell when there is no PDSCH to be transmitted.

For coordinated transmission, eNB1 can designate a CSI-IM position thereof and a transmission scheme of eNB2 in the corresponding position and notify eNB2 of the CSI-IM position and the transmission scheme. Here, transmission schemes are classified based on an operation when there is a PDSCH to be transmitted from eNB2 and an operation when there is no PDSCH to be transmitted. A transmission scheme in the CSI-IM resource position of eNB1 when there is a PDSCH to be transmitted and a transmission scheme in the CSI-IM resource position of eNB1 when there is no PDSCH to be transmitted may be individually designated or designated as a combination of the two cases, as shown in Table 7. Otherwise, only some of the schemes shown in Table 7 may be designated as transmission schemes in the CSI-IM position of eNB1. Alternatively, eNB1 notifies eNB2 of the CSI-IM resource position of eNB1 and desirable transmission schemes of eNB2 in the corresponding position and eNB2 notifies eNB1 of a signal transmission scheme to be applied to the CSI-IM resource position of eNB 1 as a response. Information is exchanged between the eNBs through an interface such as X2-interface or S1-interface.

Dynamic Point Reduced Power Almost Blanking

The present invention provides a method for cooperatively determining, by neighboring cells, whether a PDSCH is transmitted and transmit (Tx) power for efficient data transmission of cell-edge UEs as an extension of the DPB coordinated transmission scheme. Description will be given of a case that can be set to one of a normal state in which an eNB transmits a PDSCH with maximum power, a reduced power (RP) state in which the eNB transmits the PDSCH with reduced power and a blanking state in which the eNB transmits no PDSCH.

For distributed DPB scheduling, an eNB allocates a plurality of CSI processes to cell-edge UEs, is reported CSI according to transmission states of neighbor cells and determines whether RP transmission or blanking of a neighbor cell is helpful based on the reported CSI. Upon determination that RP transmission or blanking of the neighbor eNB is necessary through such process, the eNB transmits an RP transmission or blanking request message to the neighbor eNB. A gain that can be obtained according to RP transmission or blanking or the need for RP transmission or blanking may be included in the form of a metric value in the RP transmission or blanking request message. In addition, a desired RP transmission or blanking start timing and RP transmission or blanking interval may be designated in the message and transmitted. Furthermore, a gain according to RP transmission and a gain according to blanking may be included in one message and transmitted.

To respond to such request, the neighbor eNB can notify the eNB of whether RP transmission or blanking is performed, the RP transmission or blanking start timing and blanking interval. Even when there is no request, the neighbor eNB may notify the eNB of whether blanking is performed, the blanking start timing and blanking interval when the neighbor eNB may not transmit a PDSCH since there is no longer UE to be served. The blanking interval may be set to infinity. In this case, it is determined that blanking is valid until a message signaling PDSCH transmission and PDSCH transmission start timing is transmitted. In addition, when the neighbor eNB needs to transmit a PDSCH since a UE to be newly served is present after a period of time during which the neighbor eNB transmits no PDSCH since there is no UE to be served, the neighbor eNB may transmit a message signaling PDSCH transmission start timing and Tx power to the eNB prior to transmission of the PDSCH.

A message may be transmitted between the eNBs through an interface such as X2-interface or S1-interface. It is necessary to set RP transmission or blanking start timing and PDSCH transmission start timing or PDSCH Tx power variation application timing in consideration of time required for transmission through the interface.

When one of the normal state in which an eNB transmits a PDSCH with maximum power, the RP state in which the eNB transmits the PDSCH with reduced power and the blanking state in which the eNB transmits no PDSCH can be set, signal transmission schemes in an RE position corresponding to a CSI-IM resource of a neighbor cell can be subdivided, as shown in Table 8, and eNB1 can designate a CSI-IM position thereof and a transmission scheme of eNB2 in the corresponding position from among the schemes shown in Table 8 and notify eNB2 of the CSI-IM position and the transmission scheme. Otherwise, eNB1 can notify eNB2 of the CSI-IM position thereof and desirable transmission schemes of eNB2 in the corresponding position and eNB2 can notify eNB1 of a signal transmission scheme to be applied to the CSI-IM position of eNB1 as a response.

TABLE 8

| Scheme | When there is a PDSCH to be transmitted | When there is no PDSCH to be transmitted |
| --- | --- | --- |
| 1 | The PDSCH or a dummy signal to which the same Tx power and the same PMI as those of the PDSCH have been applied | No TX |
| 2 | A dummy signal to which the same Tx power as that of the PDSCH and a full-rank PMI have been applied | No TX |
| 3 | A dummy signal to which the same Tx power and the same PMI as those of a PDSCH that will be transmitted after X msec have been applied | A dummy signal to which the same Tx power and the same PMI as those of a PDSCH that will be transmitted after X msec have been applied |
| 4 | A dummy signal to which maximum power and the same PMI as that of the PDSCH have been applied | A dummy signal to which maximum power and the full-rank PMI have been applied |
| 5 | A dummy signal to which reduced power and the same PMI as that of the PDSCH have been applied | A dummy signal to which reduced power and the full-rank PMI have been applied |
| 6 | A dummy signal to which maximum power and the full-rank PMI have been applied | A dummy signal to which maximum power and the full-rank PMI have been applied |
| 7 | A dummy signal to which reduced power and the full-rank PMI have been applied | A dummy signal to which reduced power and the full-rank PMI have been applied |
| 8 | No TX | No TX |

Scheme 1)

When there is a PDSCH to be transmitted, an eNB transmits the PDSCH or a dummy signal to which the same PMI as that of the PDSCH has been applied in a CSI-IM resource position of a neighbor cell. When there is no PDSCH to be transmitted, the eNB transmits no signal in the corresponding position. Scheme 1 can improve CQI accuracy to obtain high transmission efficiency if a PMI applied to an interference signal when a UE of a neighbor cell receives a PDSCH is equal to a PMI of an interference signal applied to CSI-IM at CSI estimation timing.

Scheme 2)

When there is a PDSCH to be transmitted, the eNB can transmit a dummy signal to which a full-rank PMI has been applied in the CSI-IM resource position of the neighbor cell. When there is no PDSCH to be transmitted, the eNB transmits no signal in the corresponding position. When it is difficult to estimate the PMI applied to an interference signal when a neighbor cell UE receives a PDSCH, inaccuracy of CQI can be minimized by considering the full-rank PMI as the PMI of an interference signal applied to CSI-IM at CSI estimation timing.

The aforementioned scheme 1 is suitable for a case in which a representatively scheduled UE is fixed and a PDSCH is transmitted thereto when the possibility that the PMI is changed during PDSCH scheduling is low, whereas scheme 2 is suitable for a case in which the PDSCH is transmitted while the representatively scheduled UE is changed per subframe when the possibility that the PMI is changed during PDSCH scheduling is high.

Scheme 3)

A dummy signal to which the same PMI as that of a PDSCH to be transmitted after X msec has been applied is transmitted in the CSI-IM resource position of the neighbor cell in both a case in which there is a PDSCH to be transmitted and a case in which there is no PDSCH to be transmitted. To achieve this, the corresponding eNB needs to schedule served UEs before at least X msec.

Schemes 1, 2 and 3 are representative signal transmission schemes to be applied by the neighbor eNB to a CSI-IM resource that needs to be set for a non-CoMP UE, that is, a UE to which only a single CSI process is assigned. The following schemes 4, 5 and 6 are representative signal transmission schemes to be applied by the neighbor eNB to CSI-IM resources that need to be set for a CoMP UE, that is, a UE to which multiple CSI processes are allocated.

Scheme 4)

When there is a PDSCH to be transmitted, the corresponding eNB can transmit a dummy signal to which the same PMI as that of the PDSCH has been applied in the CSI-IM resource position of the neighbor cell with maximum power. When there is no PDSCH to be transmitted, the eNB can transmit a dummy signal to which the full-rank PMI has been applied in the corresponding position with maximum power.

Scheme 5)

When there is a PDSCH to be transmitted, the eNB can transmit a dummy signal to which the same PMI as that of the PDSCH has been applied in the CSI-IM resource position of the neighbor cell with reduced power. When there is no PDSCH to be transmitted, the eNB can transmit a dummy signal to which the full-rank PMI has been applied in the CSI-IM resource position of the neighbor cell with reduced power.

Scheme 6)

The eNB can transmit a dummy signal to which the full-rank PMI has been applied in the CSI-IM resource position of the neighbor cell with maximum power in both a case in which there is a PDSCH to be transmitted and a case in which there is no PDSCH to be transmitted.

Scheme 7)

The eNB can transmit a dummy signal to which the full-rank PMI has been applied in the CSI-IM resource position of the neighbor cell with reduced power in both a case in which there is a PDSCH to be transmitted and a case in which there is no PDSCH to be transmitted.

Scheme 8)

The eNB transmits no signal in the CSI-IM resource position of the neighbor cell in both a case in which there is a PDSCH to be transmitted and a case in which there is no PDSCH to be transmitted.

Figure 8:
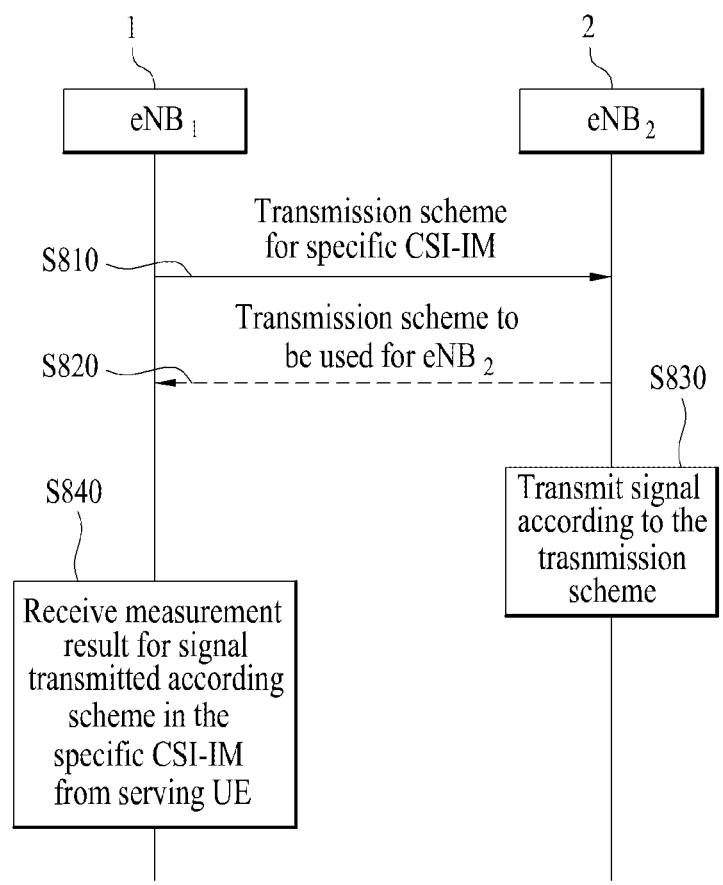
FIG. 8 is a diagram showing operation according to one embodiment of the present invention.

FIG. 8 illustrates an operation according to an embodiment of the present invention.

The operation shown in FIG. 8 relates to a signal transmission method for coordinated scheduling in a wireless communication system. The signal transmission method may be performed by eNBs participating in coordinated scheduling or transmission points (TPs) and by UEs served by the eNBs or TPs.

Referring to FIG. 8, $eNB_1$ (1) may transmit information on a transmission scheme that $eNB_1$ (1) wants $eNB_2$ (2) to use in CSI-IM (or CSI-IM resource) to be set for a UE served thereby for coordinated scheduling with $eNB_2$ (2) (S810). The transmission scheme may be one of the aforementioned schemes shown in Table 7 or 8. Otherwise, $eNB_1$ (1) may notify $eNB_2$ (2) of a plurality of transmission schemes from among the aforementioned schemes shown in the tables as candidates. The transmission scheme may be determined according to whether there is downlink data to be transmitted by $eNB_2$ (2) in a subframe to which the CSI-IM resource belongs and/or whether the UE for which the CSI-IM resource is set (i.e. UE served by $eNB_1$ (1)) has been allocated a single CSI process or multiple CSI processes.

$eNB_2$ (2) may notify $eNB_1$ (1) of a transmission scheme to be used therefor as a response to transmission of step S810 (S820).

Steps S810 and S820 correspond to coordination operation for coordinated transmission of the eNBs. Upon completion of the coordination operation, $eNB_2$ (2) may transmit a downlink signal in the CSI-IM resource according to the transmission scheme (S830). The UE served by $eNB_1$ (1) may measure the downlink signal in the CSI-IM resource, which is not shown. Then, the UE may report a downlink signal measurement result to $eNB_1$ (1) (S840). Accordingly, $eNB_1$ (1) can determine the influence of $eNB_2$ (2) on the UE served thereby. For example, $eNB_1$ (1) can determine that no signal transmission from $eNB_2$ (2) during a specific interval is advantageous for coordinated transmission on the basis of the measurement result. In this case, $eNB_1$ (1) may transmit, to $eNB_2$ (2), a message for requesting $eNB_2$ (2) to stop transmission of downlink data during the specific interval. The message may include a metric value of a gain according to data transmission interruption of $eNB_2$ (2) or the need of data transmission interruption.

In addition, when $eNB_1$ (1) and $eNB_2$ (2) support reduced power (RP), $eNB_1$ (1) may determine that downlink signal transmission by $eNB_2$ (2) with RP is more advantageous for coordinated transmission.

Furthermore, if $eNB_1$ (1) is aware of beamforming supported by $eNB_2$ (2) and CSI-IM for the beamforming is possible, $eNB_1$ (1) may request $eNB_2$ (2) to transmit a downlink signal with specific beamforming, that is, a specific PMI.

While an embodiment of the present invention has been briefly described with reference to FIG. 8, the embodiment related to FIG. 8 may include at least part of the aforementioned embodiments alternatively or additionally.

Figure 9:
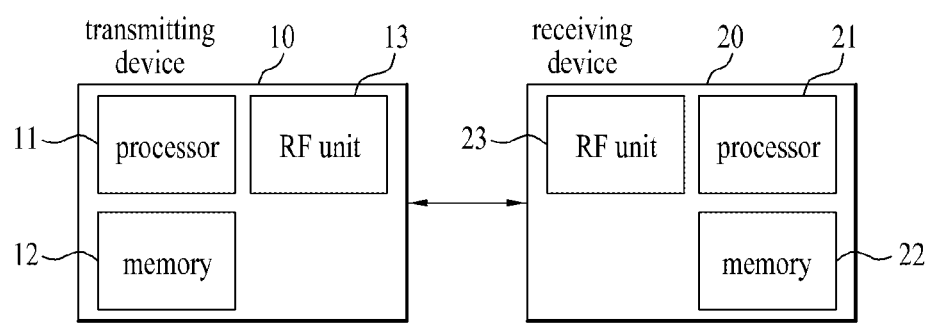
FIG. 9 is a block diagram of an apparatus for implementing embodiment(s) of the present invention.

FIG. 9 is a block diagram of a transmitting device 10 and a receiving device 20 configured to implement exemplary embodiments of the present invention. Referring to FIG. 12, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily store input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

What is claimed is:

1. A method for transmitting signals for coordinated scheduling in a wireless communication system, the method performed by a base station and comprising:
transmitting, to a neighbor base station, information on a transmission scheme in a specific channel state information-interference measurement (CSI-IM) resource; and
receiving, from a mobile terminal served by the base station, a measurement result with respect to a downlink signal transmitted from the neighbor base station according to the transmission scheme in the specific CSI-IM resource,
wherein the transmission scheme is determined according to whether there is downlink data to be transmitted by the base station in a subframe to which the specific CSI-IM resource belongs and/or whether the mobile terminal configured with the specific CSI-IM resource is allocated a single CSI process or multiple CSI processes.

2. The method according to claim 1, wherein
if there is downlink data to be transmitted by the base station in the subframe to which the specific CSI-IM resource belongs, the transmission scheme indicates that the base station transmits the downlink data or a dummy signal using the same precoding matrix index (PMI) as that of the downlink data in the specific CSI-IM resource, and
if there is no downlink data to be transmitted by the base station in the subframe to which the specific CSI-IM resource belongs, the transmission scheme indicates that the base station transmits no signal in the specific CSI-IM resource.

3. The method according to claim 1, wherein
if there is downlink data to be transmitted by the base station in the subframe to which the specific CSI-IM resource belongs, the transmission scheme indicates that the base station transmits a dummy signal using a full-rank PMI in the specific CSI-IM resource, and
if there is no downlink data to be transmitted by the base station in the subframe to which the specific CSI-IM resource belongs, the transmission scheme indicates that the base station transmits no signal in the specific CSI-IM resource.

4. The method according to claim 1, wherein
if there is downlink data to be transmitted after specific time, the transmission scheme indicates that the base station transmits a dummy signal using the same PMI as that of the downlink data to be transmitted after the specific time in the specific CSI-IM resource, and
if there is no downlink data to be transmitted after the specific time, the transmission scheme indicates that the base station transmits no signal in the specific CSI-IM resource.

5. The method according to claim 1, wherein
if there is downlink data to be transmitted by the base station in the subframe to which the specific CSI-IM resource belongs, the transmission scheme indicates the base station transmits the downlink data or a dummy signal using the same PMI as that of the downlink data in the specific CSI-IM resource, and
if there is no downlink data to be transmitted by the base station in the subframe to which the specific CSI-IM resource belongs, the transmission scheme indicates that the base station transmits a dummy signal using a full-rank PMI in the specific CSI-IM resource.

6. The method according to claim 1, wherein the transmission scheme indicates that the base station transmits a dummy signal using a full-rank PMI in the specific CSI-IM resource.

7. The method according to claim 1, wherein the transmission scheme indicates the base station transmits no signal in the specific CSI-IM resource.

8. The method according to claim 1, further comprising determining whether the neighbor base station transmits downlink signal during a specific interval based on the measurement result.

9. The method according to claim 8, further comprising transmitting, to the neighbor base station, a message for requesting the neighbor base station to stop transmission of downlink signal during the specific interval upon determining that the neighbor base station does not transmit the downlink signal during the specific interval,
wherein the message includes a metric value of a gain according to stop of transmission of the neighbor base station or necessity for stop of transmission.

10. A method for transmitting signals by a base station for coordinated scheduling in a wireless communication system, the method performed by the base station and comprising:
receiving, from a neighbor base station, information on a transmission scheme in a specific CSI-IM resource; and
transmitting downlink signal in the specific CSI-IM resource according to the transmission scheme,
wherein the transmission scheme is determined according to whether there is downlink data to be transmitted by the base station in a subframe to which the specific CSI-IM resource belongs and/or whether the mobile terminal configured with the specific CSI-IM resource is allocated a single CSI process or multiple CSI processes.

11. A base station for coordinated scheduling in a wireless communication system, comprising:
a radio frequency (RF) unit; and
a processor configured to control the RF unit,
wherein the processor is configured to transmit, to a neighbor base station, information on a transmission scheme in a specific CSI-IM resource and to receive, from a UE served by the base station, a measurement result with respect to a downlink signal transmitted from the neighbor base station according to the transmission scheme in the specific CSI-IM resource, wherein the transmission scheme is determined according to whether there is downlink data to be transmitted by the base station in a subframe to which the specific CSI-IM resource belongs and/or whether the mobile terminal configured with the specific CSI-IM resource is allocated a single CSI process or multiple CSI processes.

\* \* \* \* \*